United States Patent
Morinaga et al.

(10) Patent No.: US 8,667,071 B2
(45) Date of Patent: Mar. 4, 2014

(54) COMMUNICATION TERMINAL AND MAIL RETURN METHOD

(75) Inventors: Yasuo Morinaga, Kawasaki (JP); Manabu Ota, Yokosuka (JP); Mitsuru Murata, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 108 days.

(21) Appl. No.: 13/257,781

(22) PCT Filed: Jan. 4, 2010

(86) PCT No.: PCT/JP2010/050009
§ 371 (c)(1),
(2), (4) Date: Jan. 4, 2012

(87) PCT Pub. No.: WO2010/109925
PCT Pub. Date: Sep. 30, 2010

(65) Prior Publication Data
US 2012/0096097 A1 Apr. 19, 2012

(30) Foreign Application Priority Data
Mar. 26, 2009 (JP) ................. 2009-076371

(51) Int. Cl.
*G06F 15/16* (2006.01)
(52) U.S. Cl.
USPC ............ 709/206; 709/205; 715/751
(58) Field of Classification Search
USPC ............ 709/206–207, 205; 715/751
See application file for complete search history.

(56) References Cited

U.S. PATENT DOCUMENTS

| | | | | |
|---|---|---|---|---|
| 2003/0120733 A1* | 6/2003 | Forman | | 709/206 |
| 2004/0006599 A1* | 1/2004 | Bates et al. | | 709/206 |
| 2005/0076090 A1* | 4/2005 | Thuerk | | 709/207 |
| 2008/0155023 A1* | 6/2008 | Kadashevich | | 709/206 |
| 2008/0235344 A1* | 9/2008 | Paul | | 709/206 |
| 2009/0019116 A1* | 1/2009 | Niebuhr | | 709/206 |
| 2009/0037541 A1* | 2/2009 | Wilson | | 709/206 |
| 2010/0281126 A1* | 11/2010 | Masuda | | 709/206 |

OTHER PUBLICATIONS

International Preliminary Report on Patentability Issued on Oct. 18, 2011 in PCT/JP10/050009 Filed Jan. 4, 2010.

* cited by examiner

*Primary Examiner* — Jungwon Chang
(74) *Attorney, Agent, or Firm* — Oblon, Spivak, McClelland, Maier & Neustadt, L.L.P.

(57) ABSTRACT

An object of the present invention is suppressing a mail transmission loop between the communication terminals. A communication terminal 1 according to the present invention includes: a communication unit 10 for receiving a mail from a transmitter; a flag confirming unit 18 for confirming whether an automatic reply flag is attached or not to the received mail; an automatic reply time confirming unit 19 for confirming the number of times of automatic replies; an automatic reply determining unit 20 for determining whether to perform the automatic reply function or not based on presence or absence of the automatic reply flag and the number of times of automatic replies; and a mail transmitting unit 23 for transmitting the automatic reply mail to the transmitter when the automatic reply function is determined to be performed; wherein the number of times of automatic replies is changed every time the automatic reply function is performed, and when the automatic reply flag is attached to the received mail and the number of times of automatic replies reaches a given value with respect to the received mail, the automatic reply determining unit 20 determines not to perform the automatic reply function.

4 Claims, 8 Drawing Sheets

Fig.4

MAIL RECEIVING HISTORY RETAINING UNIT ~17

| MAIL HEADER ID | NUMBER OF TIMES OF AUTOMATIC REPLIES |
|---|---|
| 1234 | 1 |
| 5678 | 3 |
| 0123 | 0 |

Fig.5

| STATE | MAIL SENTENCE |
|---|---|
| TALKING ON THE PHONE | TALKING ON THE PHONE IS UNDER WAY |
| APPLICATION BEING ACTIVATED | NOT AVAILABLE NOW |
| SCHEDULE IS REGISTERED | XXX IS UNDER WAY |
| AREA WHERE TERMINAL USE IS PROHIBITED | BEING IN AN AREA WHERE TERMINAL USE IS PROHIBITED |
| IN MOTION | BEING IN MOTION AND UNABLE TO REPLY |
| ... | ... |

MAIL SENTENCE STORING UNIT 22

COMMUNICATION TERMINAL AND MAIL RETURN METHOD

TECHNICAL FIELD

The present invention relates to a communication terminal and a mail return method.

BACKGROUND ART

In recent years, communication by transmitting and receiving mails with a portable terminal has been actively conducted and there are more and more cases where a recipient of the mail is demanded to quick reply. Therefore, a communication terminal such as a cellular phone that includes a function capable of sending an automatic reply in response to an incoming mail, for example, when a recipient is unable to quickly send a reply to the incoming mail, is well known (for example, see Patent Literature 1). That is, in the case that sending a reply is expected to be impossible when an incoming mail is received, a user performs a given mode setting to the communication terminal, enabling to automatically send a reply mail with a given content to the incoming mail.

CITATION LIST

Patent Literature

Patent Literature 1: Japanese Patent Application Laid-Open Publication No. 2004-206627

SUMMARY OF INVENTION

Technical Problem

However, in the communication terminal that includes the conventional function to send an automatic reply mail as described in the Patent Literature 1, when both terminals at a transmitting side and at a receiving side perform the function to send an automatic reply mail, transmission of the automatic reply mail is looped between the terminals, causing a problem of unnecessary traffic occurring in a network.

The present invention has been made to solve the problem described above and aims to provide a communication terminal capable of suppressing mail transmission loop between the communication terminals and preventing unnecessary traffic from occurring in a network, and a return mail method.

Solution to Problem

In order to solve the problems described above, a communication terminal according to the present invention includes, in a communication terminal having an automatic reply function capable of setting to send a given automatic reply mail in response to receiving a mail: receiving means for receiving a mail from a transmitter; flag confirming means for confirming whether an automatic reply flag indicating an automatic reply mail sent by the automatic reply function of the transmitter is attached or not to the mail received by the receiving means; reply time confirming means for confirming the number of times of automatic replies reflecting the number of times of currently possible replies by the automatic reply function with respect to the mail received by the receiving means; determining means for determining, based on presence or absence of the automatic reply flag confirmed by the flag confirming means and the number of times of automatic replies confirmed by the reply time confirming means, whether to perform the automatic reply function or not; and transmitting means for transmitting the automatic reply mail to the transmitter when the determining means determines to perform the automatic reply function; wherein the number of times of automatic replies is changed every time the automatic reply function is performed, and when the automatic reply flag is attached to an incoming mail and also, the number of times of automatic replies reaches a given value with respect to the incoming mail, the determining means determines not to perform the automatic reply function.

Similarly, in order to solve the problems described above, the mail return method according to the present invention is a mail return method performed by a communication terminal having an automatic reply function capable of setting to send a given automatic reply mail in response to receiving a mail includes a receiving step of receiving a mail from a transmitter; a flag confirming step of confirming whether an automatic reply flag indicating an automatic reply mail sent by the automatic reply function of the transmitter is attached or not to the mail received at the receiving step; a reply time confirming step of confirming the number of times of automatic replies reflecting the number of times of currently possible replies by the automatic reply function with respect to the mail received at the receiving step; a determining step of determining, based on presence or absence of the automatic reply flag confirmed at the flag confirming step and the number of times of automatic replies confirmed at the reply time confirming step, whether to perform the automatic reply function or not; a transmitting step of transmitting the automatic reply mail to the transmitter when the automatic reply function is determined to be performed at the determining step; and a changing step of changing the number of times of automatic replies when the automatic reply function is performed; wherein when the automatic reply flag is attached to an incoming mail and also the number of times of automatic replies reaches a given value with respect to the incoming mail, the automatic reply function is determined not to be performed at the determining step.

In the communication terminal and the mail return method, when the automatic reply flag indicating a reply sent by an automatic reply function of the transmitter is attached to the incoming mail from the transmitter; and also the number of times of automatic replies reflecting the number of times of currently possible replies by the automatic reply function reaches a given value; no automatic reply function is performed and no automatic reply mail is sent. Accordingly, even when the communication terminals both at a transmitting side and at a receiving side perform the automatic reply function, in a case where transmission of the automatic reply mail is looped between the communication terminals the given number of times, the automatic reply function thereafter is not performed with respect to the mail. As a result, it is possible to suppress a mail transmission loop between the communication terminals and prevent unnecessary traffic from occurring in a network.

Furthermore, the communication terminal of the present invention may include history retaining means for retaining a mail identifier attached in common to each of a mail and a reply mail of the mail to be associated with the number of times of automatic replies to the mail having the mail identifier attached thereto, wherein the reply time confirming means preferably acquires, based on the mail identifier attached to the mail received by the receiving means, the number of times of automatic replies from the history retaining means. In this way, it is possible to accurately confirm the number of times of automatic replies with respect to the incoming mail.

Furthermore, the communication terminal of the present invention may include mail identifier confirming means for confirming whether the mail identifier attached to the mail received by the receiving means is retained in the history retaining means or not, wherein when the history retaining means retains the mail identifier of the incoming mail, the automatic reply flag is attached to the incoming mail, and the number of times of automatic replies to the incoming mail reaches a given value, the determining means preferably determines not to perform the automatic reply function. In this way, it is possible to accurately determine a state of a mail transmission loop between the communication terminals.

Advantageous Effects of Invention

In the communication terminal and the mail return method according to the present invention, it is possible to suppress a mail transmission loop between the communication terminals and prevent unnecessary traffic from occurring in a network.

BRIEF DESCRIPTION OF DRAWINGS

FIG. 4 is a diagram illustrating an exemplary configuration of a mail receiving history retaining unit.

FIG. 5 is a diagram illustrating an exemplary configuration of a mail sentence storing unit.

DESCRIPTION OF EMBODIMENTS

With reference to drawings, embodiments of the present invention will be described below in detail. The same or similar element is given the same reference sign, so that redundant explanation is omitted.

Figure 1:
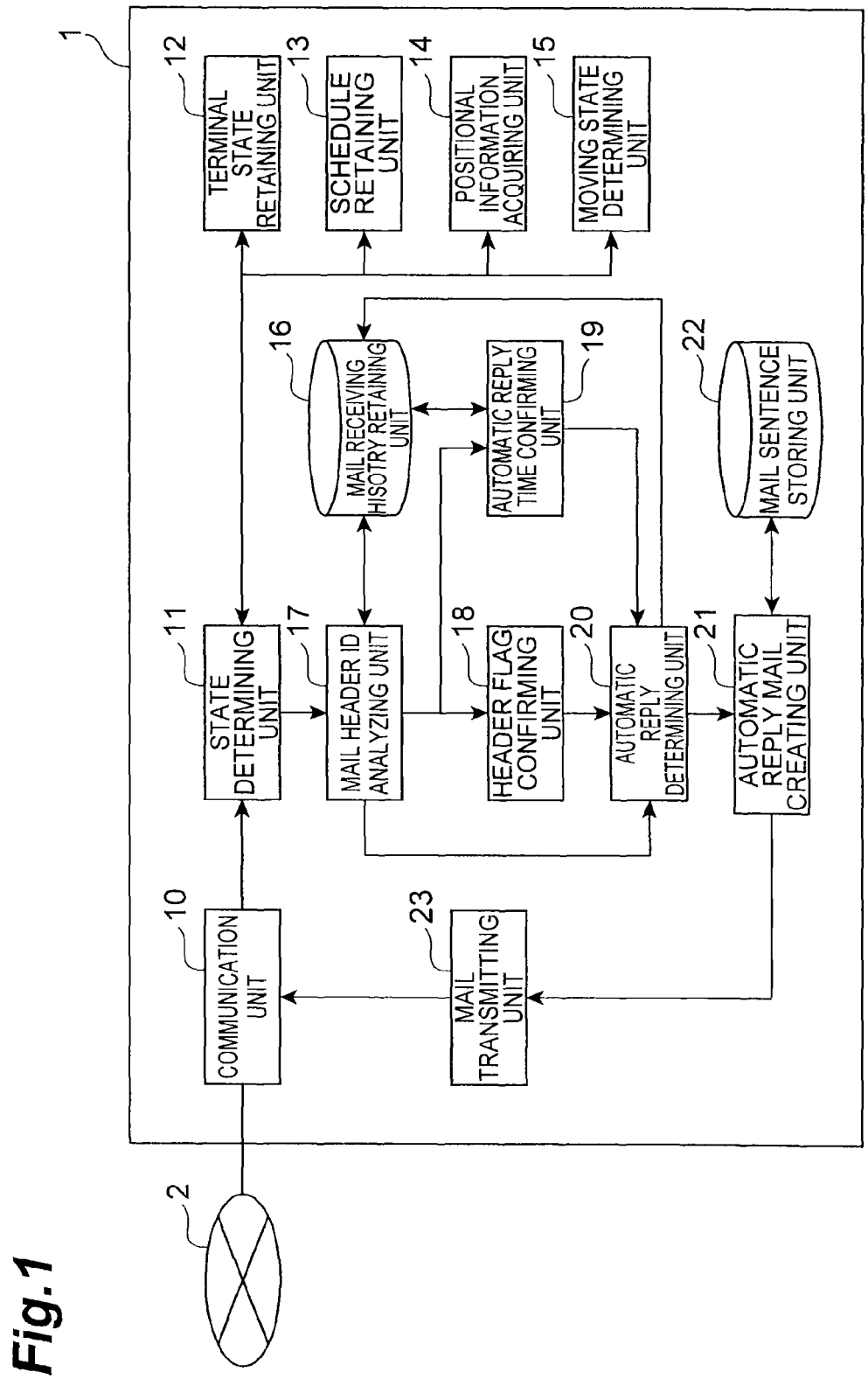
FIG. 1 is a functional block diagram illustrating a functional configuration of a communication terminal according to an embodiment of the present invention.

FIG. 1 is a functional block diagram illustrating a functional configuration of a communication terminal 1 according to the present embodiment. The communication terminal 1 is capable of transmitting and receiving a mail through a network 1 with another apparatus and is configured by an apparatus such as a cellular phone, for example. In addition, the communication terminal 1 has an "automatic reply function" capable of setting to automatically send a given automatic reply mail to a transmitter of an incoming mail, when it is recognized by a user setting or a state determination of the terminal itself that it is impossible to quickly send a reply mail upon receiving the mail from the transmitter.

The communication terminal 1 has a communication unit (receiving means) 10, a state determining unit 11, a terminal state retaining unit 12, a schedule retaining unit 13, a positional information acquiring unit 14, a moving state determining unit 15, a mail receiving history retaining unit (history retaining means) 16, a mail header ID analyzing unit (mail identifier confirming means) 17, a header flag confirming unit (flag confirming means) 18, an automatic reply time confirming unit (reply time confirming means) 19, an automatic reply determining unit (determining means) 20, an automatic reply mail creating unit 21, a mail sentence storing unit 22, and a mail transmitting unit 23 (transmitting means).

Figure 2:
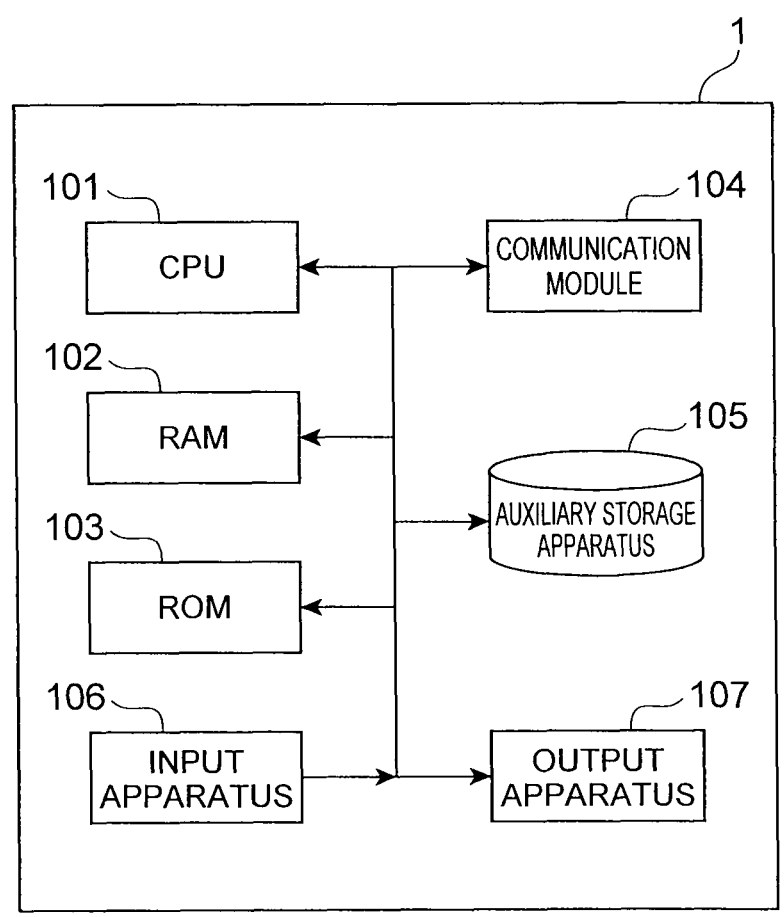
FIG. 2 is a hardware block diagram of the communication terminal.

FIG. 2 is a hardware block diagram of the mobile terminal 1. As shown in FIG. 2, the mobile terminal 1 is physically configured as a computer system including a CPU 101, a RAM 102 and a ROM 103 that serve as a main storage apparatus; a communication module 104 that is a device for transmitting and receiving data through a wireless communication network, an auxiliary storage apparatus 105 such as a hard disk, a flash memory or the like; an input apparatus 106 serving as an input device such as a keyboard or the like, and an output apparatus 107 such as a display or the like. Each function illustrated in FIG. 1 is realized by causing a given computer software to be read in hardware such as the CPU 101, the RAM 102 or the like illustrated in FIG. 2 and thereby causing the communication module 104, the input apparatus 106 and the output apparatus 107 to operate under control of the CPU 101, as well as, by reading or writing data in the RAM 102 and the auxiliary storage apparatus 105. With reference to FIG. 1, each functional element of the mobile terminal 1 will be described below.

The communication unit 10 is a unit for receiving a mail transmitted from an apparatus as a transmitter through the network 2. Upon receiving the mail, the communication unit 10 notifies the state determining unit 11 of the fact that the mail has been received.

Upon receiving notice to the effect of receiving the mail from the communication unit 10, the state determining unit 11 acquires information indicating a state of a user of the mobile terminal 1 from the terminal state retaining unit 12, the schedule retaining unit 13, the positional information acquiring unit 14, the moving state determining unit 15 and the like. The information indicating the state of the user is information to be used for determining whether the user of the mobile terminal is able to send a reply to an incoming mail or not. The state determining unit 11 determines based on the information indicating the state of the user whether sending a reply to the incoming mail is possible or not and transmits a determination result and the information indicating the state of the user to the mail header ID analyzing unit 17. Detailed explanation about determination whether sending a reply to the mail is possible or not will be given below.

The terminal state retaining unit 12 is a unit for retaining a state of the communication terminal 1. The state of the communication terminal 1 retained by the terminal state retaining unit 12 is acquired by the state determining unit 11 to be used for information indicating a state of the user. The terminal state retaining unit 12 retains as the state of the communication terminal 1, for example, an activated state of application, a talking state, a setting (automatic reply function setting on/off) that can be switched on/off by a user operation whether or not to perform an automatic reply function to send an automatic reply mail, and the like. In the automatic reply function setting, when quickly sending a reply to an incoming mail is expected to be impossible, such as at the time of getting on a train, and in the case where the user desires to send an automatic reply mail, the automatic reply function is switched on by the user operation to allow the automatic reply function to be performed. Furthermore, when the user becomes available to quickly send a reply, such as when the user gets off the train and in the case where the user does not desire to send an automatic reply, the automatic reply function is switched off by the user operation to allow the automatic reply function not to be performed.

When it is determined based on the information acquired from the terminal state retaining unit 12 that the application is being activated; talking on the phone is under way; or the setting is made to perform the automatic reply function (automatic reply function on) in the communication terminal 1, the state determining unit 11 determines that operation for creating a mail or for sending a reply mail is impossible, so that it is impossible to send a reply mail. Even when the setting is made not to perform the automatic reply function (automatic reply function off) in the communication terminal 1, in the case where the application is being activated; talking on the phone is underway; or sending a reply mail is determined to be impossible based on information from the schedule retaining unit 13, the positional information acquiring unit 14 and the moving state determining unit 15, the state determining unit 11 may put higher priority on a determination result that the communication terminal 1 autonomously determines about a state of itself and may determine that sending a reply mail is impossible so that the automatic reply function should be performed.

Figure 3:
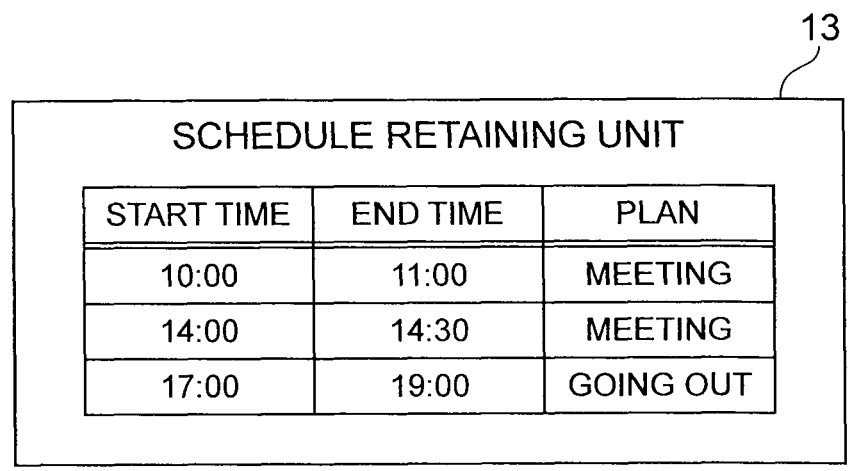
FIG. 3 is a diagram illustrating an exemplary configuration of a schedule retaining unit.

The schedule retaining unit 13 is a unit for retaining schedule information of the user of the mobile terminal 1. The schedule information retained in the schedule retaining unit 13 is acquired by the state determining unit 11 and is to be used as the information indicating the state of the user. FIG. 3 is a diagram illustrating an exemplary configuration of the schedule retaining unit 13. As illustrated in FIG. 3, a start time, an end time and a plan are stored as the schedule information, while being associated with each other. The schedule information stored in the schedule retaining unit 13 is registered in advance by the user, for example.

When receiving a mail, the state determining unit 11 refers to the schedule retaining unit 13 and determines that sending a reply mail is impossible when any schedule information is registered at the time of receiving the mail. The schedule retaining unit 13 is configured inside the mobile terminal 1 in the present embodiment but may be configured in another apparatus capable of communicating thereto through the network 2.

The positional information acquiring unit 14 is a unit for acquiring positional information on a present location of the mobile terminal 1 and is configured by a global positioning system apparatus, for example. In that case, the positional information is acquired as latitude and longitude information. Furthermore, the positional information acquiring unit 14 includes map information and is capable of acquiring information such as what kind of facility the mobile terminal 1 is in based on the latitude and longitude information. The information on the facility where the mobile terminal 1 is in is acquired by the state determining unit 11 to be used as the information indicating the state of the user. The positional information acquiring unit 14 may acquire information on a base station that the mobile terminal 1 belongs to as the positional information.

The state determining unit 11 stores, for example, a facility name in association with attribute information indicating whether terminal use in the facility is allowed or not and extracts, based on the information on the facility acquired from the positional information acquiring unit 14, the attribute information indicating whether the terminal use in the facility is allowed or not. When the terminal use in the facility is not allowed, the state determining unit 11 determines that sending a reply mail is impossible.

The moving state determining unit 15 is a unit for determining a moving state such as a moving speed or acceleration of the mobile terminal 1 and is configured by an apparatus such as an acceleration sensor or a geomagnetic sensor, for example. The information on the moving state determined by the moving state determining unit 15 is acquired by the state determining unit 11 to be used as the information indicating the state of the user.

When determining, based on the information on the moving state acquired from the moving state determining unit 15, that the mobile terminal 1 is moving at a speed faster than a given speed, for example, the state determining unit 11 determines that the user of the mobile terminal 1 is in motion so that sending a reply mail is impossible.

The mail receiving history retaining unit 16 is a database for retaining a history of the incoming mail in the past. FIG. 4 is a diagram illustrating an exemplary configuration of the mail receiving history retaining unit 16. As illustrated in FIG. 4, the mail receiving history retaining unit 16 retains, specifically, any one of the mail, a "mail header ID (mail identifier)" attached in common to each of the mail and a reply mail thereof, and the "number of times of automatic replies" indicating the number of times of currently possible replies by the automatic reply function with respect to the mail having the mail identifier attached thereto, which are associated with each another as one record. Here, the "mail header ID" is a unique identification number to be used for grasping whether the mail is created by a reply or not and it is possible by referring to the ID to decide whether there was an exchange of the reply to the same mail in the past.

Furthermore, to the "number of times of automatic replies", a given number of times is individually set in each communication terminal in advance. In the example illustrated in FIG. 4, the given number of times is set to be "three times". In the case that an automatic reply is sent when an incoming mail having an associated mail header ID attached thereto is received, the "number of times of automatic replies" is deducted one time by a command from the automatic reply determining unit 20 described below. In FIG. 4, the number of times of automatic replies for a mail header ID "1234" is "1", for example. This shows that the automatic reply mail was sent twice in response to the incoming mail having the mail header ID "1234" attached thereto and the number of times of currently possible replies is one time.

Furthermore, the number of times of automatic replies for a mail header ID "5678" is "3". This shows that no automatic reply mail is sent to the incoming mail having the mail header ID "1234" attached thereto and the number of times of currently possible replies is three times. Additionally, the number of times of automatic replies for a mail header ID "0123" is "0". This shows that the automatic reply mail has been so far sent three times to the incoming mail having the mail header ID "0123" attached thereto and the number of times of currently possible replies is 0 times, that is, it is impossible to perform the automatic reply function.

The mail header ID analyzing unit 17 is a unit for analyzing the "mail header ID" written in a mail header of the incoming mail and confirming whether there is presence or absence of a mail having the same mail header ID in a receiving history. Specifically, the mail header ID analyzing unit 17 confirms whether the mail header ID attached to the mail header of the incoming mail is retained in the mail receiving history retaining unit 16. The mail header ID analyzing unit 17 transmits an analysis result to the automatic reply determining unit 20 and at the same time, when the mail header ID of the incoming mail is retained in the mail receiving history retaining unit 16, a command is transmitted to the header flag confirming unit 18 and the automatic reply time confirming unit 19 to perform processing at each unit.

The header flag confirming unit 18 is a unit for confirming whether the incoming mail has an "automatic reply flag" attached thereto, which shows that the mail is the automatic reply mail sent by an automatic reply function of the transmitter. The header flag confirming unit 18 transmits a decision results whether there is presence or absence of the automatic reply flag in the incoming mail, to the automatic reply determining unit 20.

The automatic reply time confirming unit 19 is a unit for confirming the number of times of automatic replies that shows the number of times of currently possible replies by the automatic reply function. The automatic reply time confirming unit 19 acquires, based on the mail header ID attached to the incoming mail, the number of times of automatic replies associated with the mail header ID from the mail receiving history retaining unit 16 and transmits the information of the number of times of automatic replies to the automatic reply determining unit 20.

The automatic reply determining unit 20 is a unit for determining whether to perform or not the automatic reply function based on each information received from the mail header ID analyzing unit 17, the header flag confirming unit 18, and the automatic reply time confirming unit 19. Specifically, the automatic reply determining unit 20 determines not to perform the automatic reply function, when it is confirmed by the mail header ID analyzing unit 17 that the mail header ID of the incoming mail is retained in the mail receiving history retaining unit 16; and it is confirmed by the header flag confirming unit 18 that the automatic reply flag is attached to the incoming mail; as well as, it is confirmed by the automatic reply time confirming unit 19 that the number of times of automatic replies is 0 with respect to the incoming mail.

Described below is the reason why the automatic reply function is determined not to be performed in the case of conditions described above. The state determining unit 11 previously determines that the user of the communication terminal 1 is unable to quickly send a reply. According to the conditions described above, however, there is a history of receiving a mail having the same mail header ID attached thereto in the past, and the incoming mail is an automatic reply mail from the transmitter, and moreover, the automatic reply is already sent the given number of times with respect to the mail header ID, so that it is possible to decide that transmission of the automatic reply mail is looped with the communication terminal of the transmitter. Accordingly, in order to prevent a mail transmission loop from occurring between the terminals, the automatic reply function is stopped being performed. In the communication terminal 1 of the present embodiment, receiving operation only is performed thereafter and no automatic reply function is performed with respect to the incoming mail having the same mail header ID.

Furthermore, when the conditions described above are not met, the automatic reply determining unit 20 determines to perform the automatic reply function and transmits an operation command to create an automatic reply mail to the automatic reply mail creating unit 21. Additionally, when it is determined to perform the automatic reply function, the automatic reply determining unit 20 deducts one from a value in the number of times of automatic replies that is associated with the mail header ID of the incoming mail in the mail receiving history retaining unit 16. When the mail header ID of the incoming mail this time is not retained in the mail receiving history retaining unit 16, the given number of times (three times in the present embodiment) is regarded as the number of times of automatic replies and associated with the mail header ID, to be newly recorded in the mail receiving history retaining unit 16.

The automatic reply mail creating unit 21 is a unit for creating a reply mail with a given content to reply to the transmitter of the incoming mail, when the automatic reply determining unit 20 determines to perform the automatic reply function. A mail sentence of the reply mail created here may be a simple one such as "sending a reply is impossible", but preferably include more detailed information. Additionally, as described above, the automatic reply mail creating unit 21 adds the automatic reply flag indicating an automatic reply mail sent by performing the automatic reply function to the created reply mail. The automatic reply mail creating unit 21 transmits the created reply mail to the mail transmitting unit 23.

The mail sentence storing unit 22 is means for storing the mail sentence in association with the information indicating the state of the user. In the mail sentence storing unit 22, the automatic reply mail creating unit 21 acquires the mail sentence associated with the information indicating the state of the user acquired from the state determining unit 11 via the automatic reply determining unit 20 and the like and creates the reply mail. FIG. 5 is a diagram illustrating an exemplary configuration of the mail sentence storing unit 22. When the state of the user acquired from the state determining unit 11 is "talking on the phone", for example, the automatic reply mail creating unit 21 acquires the mail sentence associated with a state "talking on the phone", that is "talking on the phone is under way" from the mail sentence storing unit 22.

Furthermore, when the state determining unit 11 determines that schedule information is registered at the time of receiving a mail and a plan in the schedule information that the state determining unit 11 acquires from the schedule retaining unit 13 is a "meeting", the reply mail creating unit 21 acquires in the mail sentence storing unit 22 the mail sentence associated with a state "schedule is registered", that is "XXX is under way" and allocates "meeting" of the plan in the schedule information to "XXX" of the mail sentence to create the mail sentence, such as "meeting is under way". Furthermore, the reply mail creating unit 21 is capable of acquiring the positional information acquired by the positional information acquiring unit 14 via the state determining unit 11 and the automatic reply determining unit 20 to add to the mail sentence.

The mail transmitting unit 23 transmits through the communication unit 10 the reply mail acquired from the reply mail creating unit 21 to the transmitter of the incoming mail.

Figure 6:
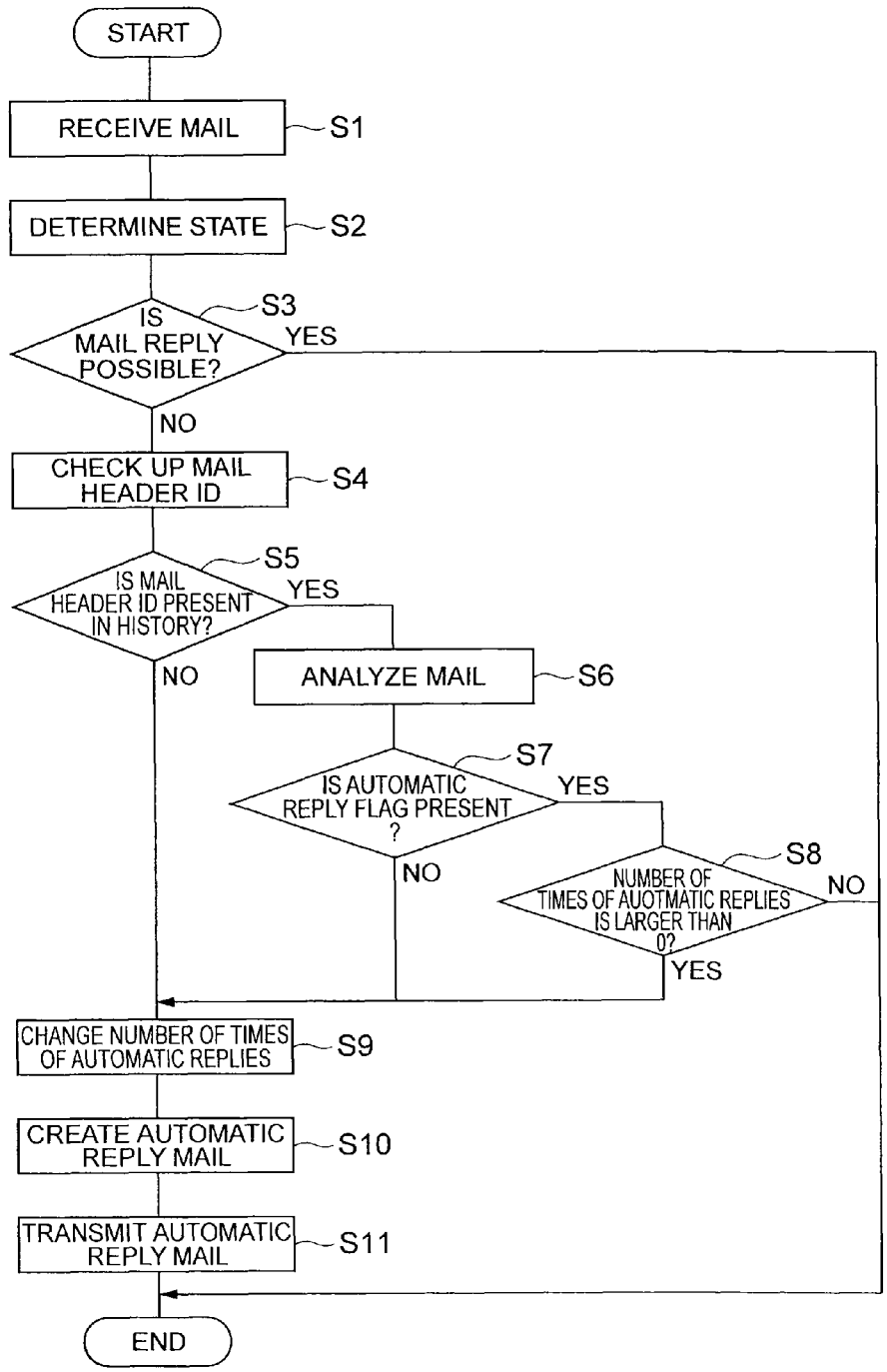
FIG. 6 is a flowchart illustrating processing contents of a method for sending a reply mail that the communication terminal performs.

Subsequently, processing procedures that the mobile terminal 1 sends a reply mail to an incoming mail will be described. FIG. 6 is a flowchart illustrating a process that the mobile terminal 1 performs in a return mail method.

First, the communication unit 10 receives a mail transmitted through the network 2 from an apparatus as a transmitter (S1) and notifies the state determining unit 11 of the fact that the mail has been received. Next, the state determining unit 11 acquires information indicating a state of a user of the mobile terminal 1 and determines whether sending a reply mail to the incoming mail is possible or not (S2). Here, the information indicating the state of the user is acquired by the terminal state retaining unit 12, the schedule retaining unit 13, the positional information acquiring unit 14 and the moving state determining unit 15 and the like.

When sending a reply mail is possible, the procedure ends, while when sending a reply mail is impossible, the procedure proceeds to step S4 (S3).

Next, the mail header ID analyzing unit 17 checks up whether the mail header ID of the mail received at step S1 is retained in the mail receiving history retaining unit 16 (S4). When the mail header ID of the incoming mail is retained in the mail receiving history retaining unit 16, the procedure proceeds to step S6, and when not retained, the procedure proceeds to step S9 (S5).

When the mail header ID of the incoming mail is retained in the mail receiving history retaining unit 16 at step S4, the incoming mail is subsequently analyzed by the header flag confirming unit 18 and the automatic reply time confirming unit 19 (S6: flag confirming step, reply time confirming step). Specifically, the header flag confirming unit 18 confirms whether the automatic reply flag is attached to the incoming mail or not, while the automatic reply time confirming unit 19 acquires, based on the mail header ID of the incoming mail, the number of times of automatic replies associated with the mail header ID from the mail receiving history retaining unit 16.

Based on an analysis result at step S6, the procedure proceeds to step S8 when the automatic reply flag is present in the incoming mail, while the procedure proceeds to step S9 when the automatic reply flag is absent (S7: determining step). Subsequently, when the number of times of automatic replies associated with the mail header ID of the incoming mail is 0, the processing procedure ends and when the number of times of automatic replies remains (is larger than 0), the procedure proceeds to step S9 (S8: determining step).

Here, decision processing of steps S5, S7 and S8 described above are performed by the automatic reply determining unit 20. When the procedure proceeds to step S9 through those decision processing, the number of times of automatic replies in the mail receiving history retaining unit 16 is changed by the automatic reply determining unit 20 (S9: changing step). When the procedure proceeds to step S9 through the decision processing at steps S7 and S8, the automatic reply determining unit 20 determines to perform the automatic reply function and deducts 1 from a value of the number of times of automatic replies associated with the mail header ID of the incoming mail in the mail receiving history retaining unit 16. Additionally, when the procedure proceeds to step S9 through the decision processing at step S5, the automatic reply determining unit 20 determines to perform the automatic reply function. Furthermore, since the mail header ID of the incoming mail this time is not retained in the mail receiving history retaining unit 16, the given number of times (three times in the present embodiment) is regarded as he number of times of automatic replies and associated with the mail header ID, to be newly recorded in the mail receiving history retaining unit 16.

Next, the reply mail creating unit 21 creates a reply mail with a given content to send a reply to the transmitter of the incoming mail and transmits the created reply mail to the mail transmitting unit 23 (S10). Creation of the mail is performed by referring to the mail sentence storing unit 22 and extracting a mail sentence based on the information indicating the state of the user acquired by the state determining unit 11.

Then, the mail transmitting unit 23 transmits the reply mail acquired from the reply mail creating unit 21 through the communication unit 10 to the transmitter of the incoming mail (S5). In this way, the processing according to the method of sending a reply mail in the mobile terminal 1 ends.

Figure 7:
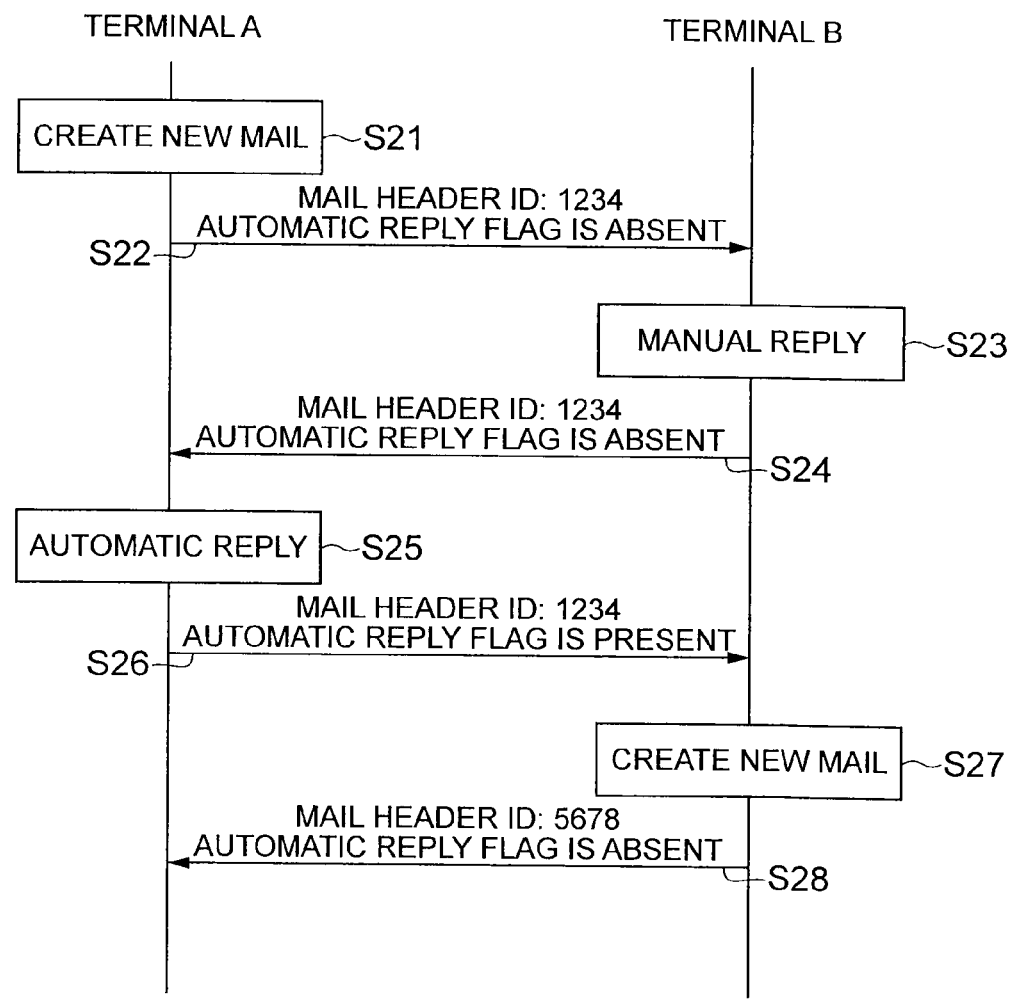
FIG. 7 is a diagram illustrating a mail header ID and an automatic reply flag that are attached to a mail when the mail is transmitted and received between two communication terminals.

Next, with reference to FIG. 7, a rule about attaching the automatic reply flag and the mail header ID to a mail will be described. FIG. 7 is a diagram illustrating the mail header ID and the automatic reply flag that are attached to the mail, when the mail is transmitted and received between the two communication terminals. As illustrated in FIG. 7, first a mail is created in a communication terminal A (S21), to which a mail header ID "1234" is attached and then transmitted to a communication terminal B (S22).

In the communication terminal B, receiving processing is performed manually by a user operation (S23). At that time, to a reply mail, the same mail header ID "1234" as that of the incoming mail (the mail sent at S22) from the communication terminal A is attached. Additionally, since the replying processing is performed manually, no automatic reply flag is attached to the reply mail. The reply mail thus created is transmitted to the communication terminal A (S24).

In the communication terminal A, the automatic reply function is performed (S25). At that time, the same mail header ID "1234" as that of the incoming mail from the communication terminal B (the one at S24) and also the automatic reply flag are attached to the reply mail, which is transmitted to the communication terminal B (S26).

Then, in the communication terminal B, instead of directly replying to the reply mail from the communication terminal A, a new mail is created (S27) and is transmitted to the communication terminal A (S28). At that time, another mail header ID "5678" different from those of the reply mails having been created so far is attached to the newly created mail. In addition, since the mail is not created by the automatic reply function, no automatic reply flag is attached.

In this way, to a mail directly replying to a certain mail (for example, a mail created by a reply function of mail software or the like), the same ID is attached thereto as the "mail header ID", regardless of whether replying processing is performed manually or automatically. When a new mail is created and transmitted instead of directly replying to an incoming mail, another mail ID different from that of the incoming mail is attached thereto.

Furthermore, the "automatic reply flag" is attached to an automatic reply mail created automatically by the replying processing performed by the automatic reply function.

Figure 8:
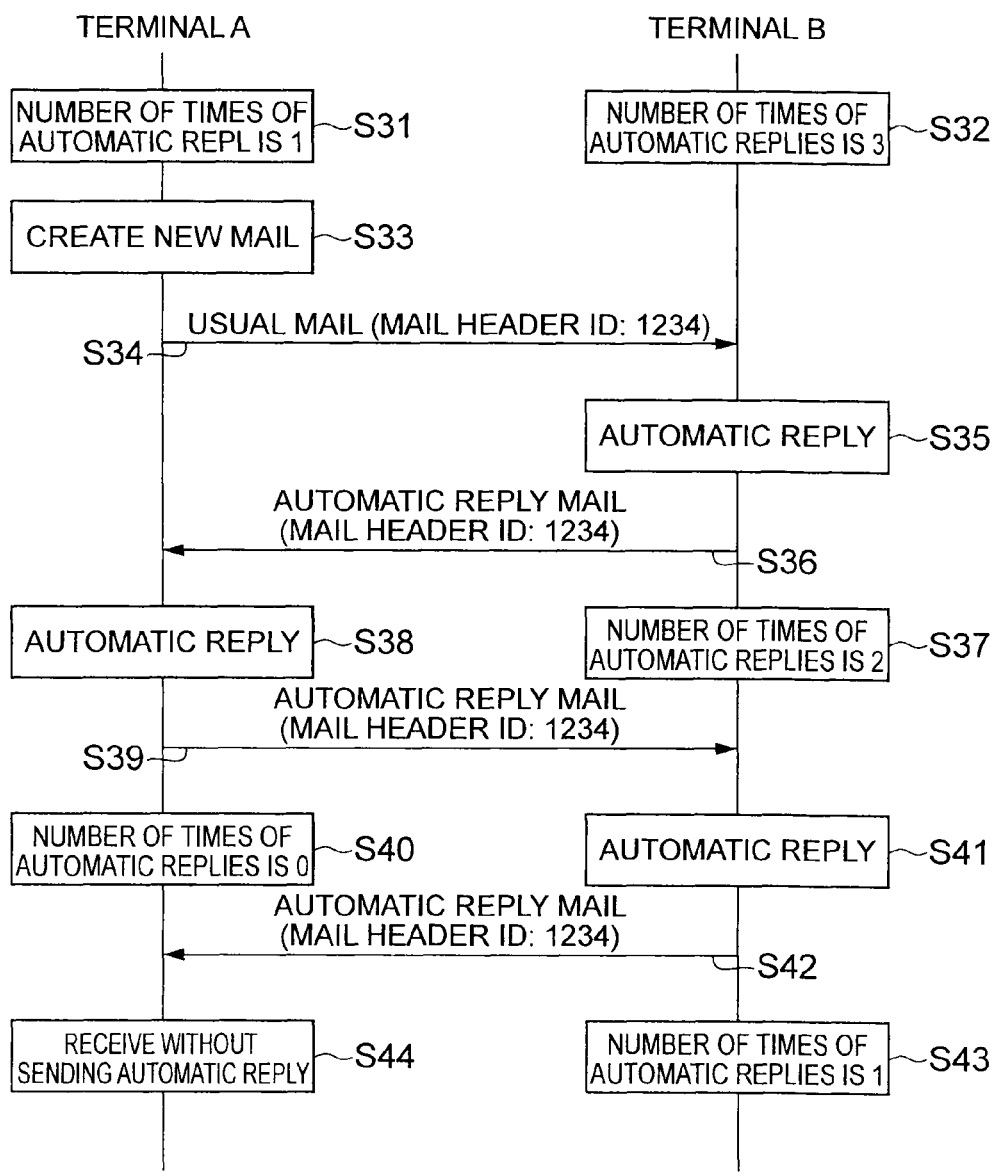
FIG. 8 is a diagram illustrating operations corresponding to the number of times of automatic replies between the terminals when the mail is transmitted and received between the two communication terminals.

Next, with reference to FIG. 8, operation of the automatic reply function corresponding to the number of times of automatic replies will be described. FIG. 8 is a diagram illustrating operation of both terminals corresponding to the number of times of automatic replies when a mail is transmitted between two communication terminals. As illustrated in FIG. 8, a given default value is set as the number of times of automatic replies for each communication terminal individually and in the example of FIG. 8, the default value for the communication terminal A is "1" (up to one round-trip communication of automatic reply is possible) (S31) and the default value of the communication terminal B is "3" (up to three round-trip communication of automatic reply is possible) (S32).

First, in the communication terminal A, a mail is created (S33), which has a mail header ID "1234" attached thereto and is transmitted to the communication terminal B (S34). In response to the incoming mail from the communication terminal A, the communication terminal B performs the automatic reply processing (S35) and sends an automatic reply mail having the same mail header ID "1234" as that of the incoming mail attached thereto to the communication terminal A (S36). Also, the number of times of automatic replies that is associated with the mail header ID "1234" and retained in the mail receiving history retaining unit 16 of the communication terminal B, is deducted from "3" to "2" (S37).

In response to the automatic reply mail from the communication terminal B, the communication terminal A performs the automatic reply processing (S38) and sends an automatic reply having the same mail header ID "1234" attached thereto as that of the incoming automatic reply mail to the communication terminal B (S39). Also, the number of times of automatic replies that is associated with the mail header ID "1234" and retained in the mail receiving history retaining unit 16 of the communication terminal A, is deducted from "1" to "0" (S40).

In response to the automatic reply mail from the communication terminal A, the communication terminal B performs the automatic reply processing (S41) and sends an automatic reply having the same mail header ID "1234" attached thereto as that of the incoming automatic reply mail to the communication terminal A (S42). Also, the number of times of automatic replies that is associated with the mail header ID "1234" and retained in the mail receiving history retaining unit 16 of the communication terminal B, is deducted from "2" to "1" (S43).

Then, in response to the automatic reply mail from the communication terminal B, the communication terminal A tries to perform the automatic reply processing. However, since the number of times of automatic replies associated with the mail header ID "1234" retained in the mail receiving history retaining unit 16 of the communication terminal A is "0", the automatic reply processing fails to be performed with respect to the mail having the mail header ID attached thereto and therefore, no automatic reply processing is performed and the general receiving processing only is performed (S44).

That is, when a mail is transmitted and received between the communication terminals both of which have the automatic reply function and different values are set as a given value of the number of times of automatic replies, the number of times of automatic reply processing depends on the smaller one of the given values. In the example of FIG. 8, for example, the communication terminal A allows the automatic reply processing up to one round-trip, while the communication terminal B allows up to three round-trip and the mail is transmitted starting from the communication terminal A. The communication terminal B is capable of performing three round-trip automatic reply processing, but after the one round-trip automatic reply processing is performed by the communication terminal A, the automatic reply mail is not sent from the communication terminal A, so that the automatic reply processing with respect to the mail header ID "1234" between the terminals A and B is stopped there.

In the example of FIG. 8, when the replying processing after step S 44 is performed manually in the communication terminal A, the communication terminal B is capable of performing the automatic reply processing further and transmitting the automatic reply having the mail header ID "1234" attached thereto to the communication terminal A. The communication terminal A, however, is incapable of performing the automatic reply processing even thereafter with respect to the mail having the mail header ID "1234" attached thereto.

As described above, in the communication terminal 1 and the mail return method according to the present embodiment, when an automatic reply flag indicating a reply sent by the automatic reply function of a transmitter is attached to an incoming mail from the transmitter and also the number of times of automatic replies indicating the number of times of currently possible replies by the automatic reply function is 0 with respect to the incoming mail, it is configured such that no automatic reply function is performed and no automatic reply is sent. Therefore, even when both communication terminals at a transmitting side and a receiving side perform the automatic reply function and transmission of the automatic reply mail is looped the number of given times between the communication terminals, the automatic reply function thereafter is not performed with respect to the mail. As a result, it is possible to suppress a mail transmission loop between the communication terminals and prevent unnecessary traffic from occurring in a network.

Furthermore, the automatic reply time confirming unit 19 acquires, based on the mail header ID attached to the incoming mail, the number of times of automatic replies from the mail receiving history retaining unit 16. In this way, it is possible to accurately confirm the number of times of automatic replies with respect to the incoming mail.

Furthermore, when the mail header ID analyzing unit 17 confirms whether the mail header ID attached to the incoming mail is retained in the mail receiving history retaining unit 16 and in the case where the mail header ID of the incoming mail is retained in the mail receiving history retaining unit 16; the automatic reply flag is attached to the incoming mail; and the number of times of automatic replies is 0 with respect to the incoming mail; the automatic reply determining unit 20 determines not to perform the automatic reply function. In this way, it is possible to accurately determine a state of the mail transmission loop between the communication terminals.

The communication terminal and the return mail method according to the present invention are described above with reference to preferable embodiments, but the present invention is not limited to the embodiment described above. For example, in the embodiment described above, the "number of times of automatic replies" retained in the mail receiving history retaining unit 16 is defined as the "number of times of currently possible replies by the automatic reply function", but may be defined instead of that as the "number of times of automatic replies that have been sent so far by the automatic reply function".

Specifically, in the embodiment described above, the number of times of possible automatic replies (for example, three times or one time) is set to the "number of times of automatic replies" as an initial state. When the automatic reply determining unit 20 determines to perform the automatic reply function with respect to the mail header ID, the number of times of automatic replies associated therewith is deducted one time. When the number of times of automatic replies reaches 0, the automatic reply determining unit 20 determines not to perform the automatic reply function. That is, the "number of times of automatic replies" means the "number of times of currently possible replies by the automatic reply function" and when the value reaches 0, sending an automatic reply is stopped.

Instead of that, it may be configured such that the initial state of the "number of times of automatic replies" is set to 0 and when the automatic reply determining unit 20 determines to perform the automatic reply function, the value is added by one time; and when the "number of times of automatic replies" reaches a given "number of times of possible automatic replies (for example three times or one time)", it is determined not to perform the automatic reply function. That is, the "number of times of automatic replies" means the "number of times of automatic replies that have been sent so far by the automatic reply function" and when that value reaches the given number of times, sending the automatic reply is stopped.

Additionally, in the present embodiment, when the automatic reply determining unit 20 determines to perform the automatic reply function, the number of times of automatic replies is changed in the mail receiving history retaining unit 16, but a timing of changing the number of times of automatic replies is not limited thereto. For example, it may be configured such that the automatic reply mail creating unit 21 or the mail transmitting unit 23 changes the number of times of automatic replies in the mail receiving history retaining unit 16.

REFERENCE SIGNS LIST

1 . . . communication terminal, 10 . . . communication unit (receiving means), 16 . . . mail receiving history retaining unit (history retaining means), 17 . . . mail header ID analyzing unit (mail identifier confirming unit), 18 . . . header flag confirming unit (flag confirming means), 19 . . . automatic reply time confirming unit (reply time confirming means), 20 . . . automatic reply determining unit (determining means), 23 . . . mail transmitting unit (transmitting means)

The invention claimed is:

1. A communication terminal having an automatic reply function capable of setting to send a given automatic reply mail in response to receiving a mail, the communication terminal comprising:

circuitry configured to
- receive a mail from a transmitter;
- confirm whether an automatic reply flag indicating an automatic reply mail sent by the automatic reply function of the transmitter is attached to the mail;
- confirm a number of times of automatic replies reflecting a number of times of currently possible replies by the automatic reply function with respect to the mail;
- determining, based on presence or absence of the automatic reply flag and the number of times of automatic replies, whether to perform the automatic reply function; and
- transmit the automatic reply mail to the transmitter when it is determined to perform the automatic reply function, wherein
- the number of times of automatic replies is changed every time the automatic reply function is performed, and
- when the automatic reply flag is attached to an incoming mail and the number of times of automatic replies reaches a given value with respect to the incoming mail, the circuitry determines not to perform the automatic reply function.

2. The communication terminal according to claim 1, wherein the circuitry is further configured to:
- retain a mail identifier attached in common to each of a mail and a reply mail of the mail to be associated with the number of times of automatic replies to the mail having the mail identifier attached thereto; and
- acquire, based on the mail identifier attached to the mail, the number of times of automatic replies.

3. The communication terminal according to claim 2, wherein the circuitry is further configured to: confirm whether the mail identifier attached to the mail is retained; and
- determine to not perform the automatic reply function when the mail identifier of the incoming mail is retained, the automatic reply flag is attached to the incoming mail, and the number of times of automatic replies to the incoming mail reaches a given value.

4. A mail return method performed by a communication terminal having an automatic reply function capable of setting to send a given automatic reply mail in response to receiving a mail, the mail return method comprising:
- a receiving step of receiving a mail from a transmitter;
- a flag confirming step of confirming whether an automatic reply flag indicating an automatic reply mail sent by the automatic reply function of the transmitter is attached or not to the mail received at the receiving step;
- a reply time confirming step of confirming the number of times of automatic replies reflecting the number of times of currently possible replies by the automatic reply function with respect to the mail received at the receiving step;
- a determining step of determining, based on presence or absence of the automatic reply flag confirmed at the flag confirming step and the number of times of automatic replies confirmed at the reply time confirming step, whether to perform the automatic reply function or not;
- a transmitting step of transmitting the automatic reply mail to the transmitter when the automatic reply function is determined to be performed at the determining step; and
- changing step of changing the number of times of automatic replies when the automatic reply function is performed; wherein
- when the automatic reply flag is attached to an incoming mail and the number of times of automatic replies reaches a given value with respect to the incoming mail, the automatic reply function is determined not to be performed at the determining step.

* * * * *